US006168178B1

(12) United States Patent
Garven, Jr. et al.

(10) Patent No.: US 6,168,178 B1
(45) Date of Patent: Jan. 2, 2001

(54) CONVERTIBLE WHEELCHAIR AND A METHOD FOR CONVERTING A WHEELCHAIR CHASSIS

(75) Inventors: Douglas M. Garven, Jr., Boulder; Murray G. Slagerman, Lafayette; Paul Richard Santoski, Boulder, all of CO (US)

(73) Assignee: Sunrise Medical HHG Inc., Longmont, CO (US)

( * ) Notice: Under 35 U.S.C. 154(b), the term of this patent shall be extended for 0 days.

(21) Appl. No.: 09/273,884

(22) Filed: Mar. 22, 1999

Related U.S. Application Data

(60) Provisional application No. 60/083,981, filed on May 2, 1998.

(51) Int. Cl.[7] .................................................. B62M 1/14

(52) U.S. Cl. ...................................... 280/250.1; 280/286

(58) Field of Search ............................... 280/286, 250.1, 280/304.1

(56) References Cited

U.S. PATENT DOCUMENTS 5,020,816 * 6/1991 Mulholland ..................... 180/250.1
5,326,126 * 7/1994 Weege ............................. 280/250.1
5,593,173 * 1/1997 Williamson ...................... 280/642
5,851,018 * 12/1998 Curran et al. .................... 280/250.1
5,851,019 12/1998 Gill et al. .
5,855,387 1/1999 Gill et al. .

* cited by examiner

*Primary Examiner*—Kevin Hurley
*Assistant Examiner*—Andrew J. Fischer
(74) *Attorney, Agent, or Firm*—MacMillan, Sobanski & Todd, LLC

(57) ABSTRACT

A wheelchair comprises a frame and a chassis. The frame has two side frame members. The side frame members include upper frame members. The upper frame members have first and second mounting positions upon which the chassis may be mounted. The chassis has two mounting brackets. The mounting brackets are selectively attachable to respective upper frame members at the first and second mounting positions. The mounting brackets have lower ends that are structured and configured to rigidly support a rear wheel assembly when the mounting brackets are attached to the upper frame member at the first mounting position to provide a fixed chassis. When the mounting brackets are attached at the second mounting position, the lower end of the mounting brackets pivotally support a swing-arm assembly and suspension member to provide a suspension chassis. The same mounting brackets may be provided to construct each chassis or different mounting brackets may be provided to construct each chassis. The invention also includes a method for converting the chassis of a wheelchair from a rigid chassis to a suspension chassis, and vice versa.

22 Claims, 8 Drawing Sheets

CONVERTIBLE WHEELCHAIR AND A METHOD FOR CONVERTING A WHEELCHAIR CHASSIS

CROSS-REFERENCE TO RELATED APPLICATIONS

This application claims the benefit of U.S. Provisional Application filed on 60/083,981, filed on May 2, 1998.

BACKGROUND OF THE INVENTION

This invention relates in general to wheelchairs and more particularly, to a wheelchair having a convertible chassis. The invention also relates to a method for converting the chassis of a wheelchair from a fixed chassis to a suspension chassis, and vice versa.

SUMMARY OF THE INVENTION

The present invention is a wheelchair comprising a frame and a chassis. The frame has two side frame members. Each side frame member comprises an upper frame member. Each upper frame member has two mounting positions upon which the chassis may be mounted. The chassis comprises two mounting brackets. Each mounting bracket is removably attachable to a respective upper frame member. The mounting brackets are selectively attachable at the first and second mounting positions. That is to say, the mounting brackets can be attached to respective upper frame members at the first mounting position or the second mounting position. Each mounting bracket has a lower end. The lower ends of the mounting brackets are structured and configured to rigidly support rear wheel assemblies when the mounting brackets are attached to the upper frame members at the first mounting position to provide a fixed chassis. When the mounting brackets are attached to the upper frame members at the second mounting position, the lower ends of the mounting brackets support a swing-arm and suspension member to provide a suspension chassis. Another embodiment of the invention includes two sets of mounting brackets. One set of mounting brackets is attachable to the upper frame members at the first mounting position and rigidly supports a rear wheel assembly to provide a rigid chassis. The other set of mounting brackets is attachable to the upper frame members at the second mounting position and supports a swing-arm and suspension member to provide a suspension chassis. The invention also includes a method for converting the chassis of a wheelchair from a rigid chassis to a suspension chassis, and vice versa.

DETAILED DESCRIPTION OF THE PREFERRED EMBODIMENT

Figure 1:
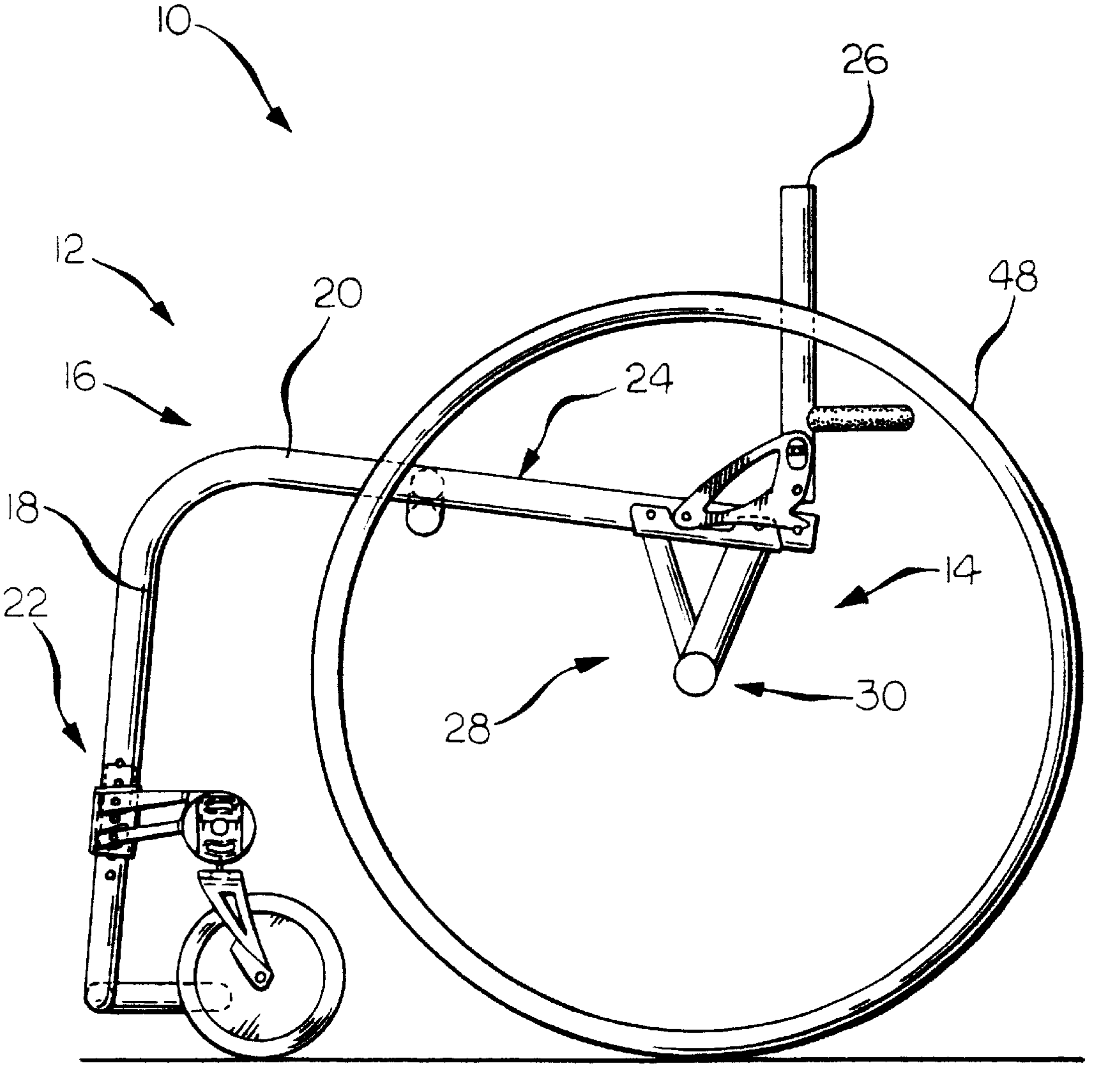
FIG. 1 is an elevational view of a wheelchair according to the present invention with a fixed chassis.

Referring now to the drawings, there is illustrated in FIG. 1 a convertible wheelchair, generally indicated at 10. The wheelchair 10 comprises a frame 12 and a convertible chassis 14. The frame 12 includes two spaced-apart side frame members 16. Each side frame member 16 is preferably L-shaped and rotated 90 degrees on its side so as to provide a front frame member 18 and upper frame member 20. Each front frame member 20 supports front caster assembly 22. A seat 24 is horizontally and laterally supported between the upper frame members 20. A backrest 26 is attached to the upper frame members 20 near the rear of the seat 24. It is preferable that the backrest 26 be pivotally attached such that it may be folded down against the seat 24. It is also preferable that the seat 24 and backrest 26 be foldable along a longitudinal axis so as to permit the wheelchair 10 to be folded into a compact form for transporting and storing.

The chassis 14 includes two spaced-apart mounting brackets 28. Each mounting bracket 28 is removably attachable to a respective upper frame member 20. Each mounting bracket 28 supports a rear wheel assembly 30. The mounting brackets 28 may be attached in any suitable manner with any suitable coupling arrangement. For example, the top of each mounting bracket 28 may include a coupling element, such as the cup-shaped member 32 shown in FIGS. 4 and 5, for receiving a respective upper frame member 20. Each cup-shaped member 32 may include a plurality of spaced-apart holes 34. A plurality of corresponding spaced-apart holes 36 may be provided in the upper frame member 20. Upon inserting the upper frame members 20 into respective cup-shaped members 32, the holes 34 in the cup-shaped members 32 are aligned with the corresponding holes 36 in the upper frame members 20. Subsequently, threaded fasteners 38 may be inserted through the holes 34 and 36 and nuts (not shown) may be threaded onto the fasteners 38 and tightened until the cup-shaped members 32 are tightly secured to the upper frame members 20.

Figure 5:
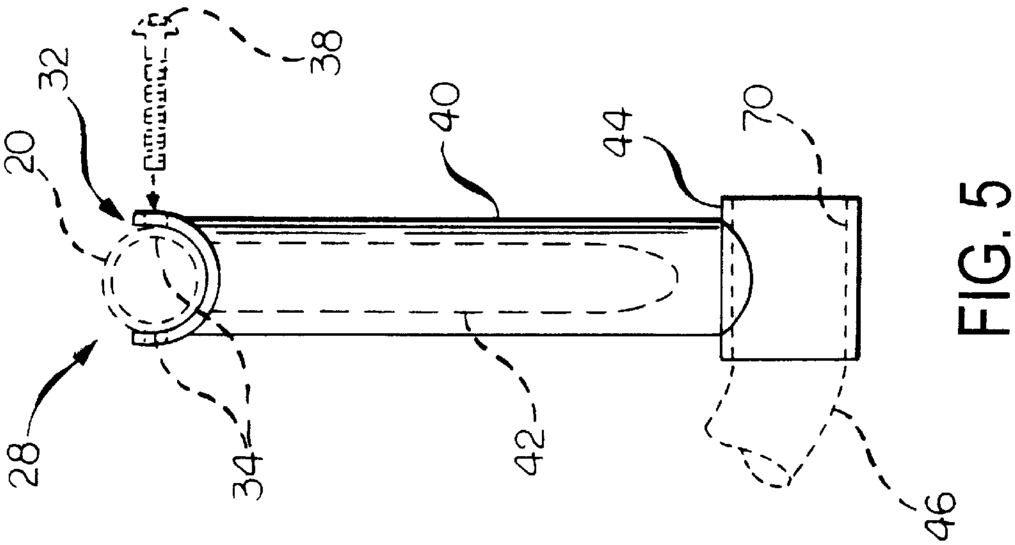
FIG. 5 is a front view of the mounting bracket shown in FIG. 4.
Figure 4:
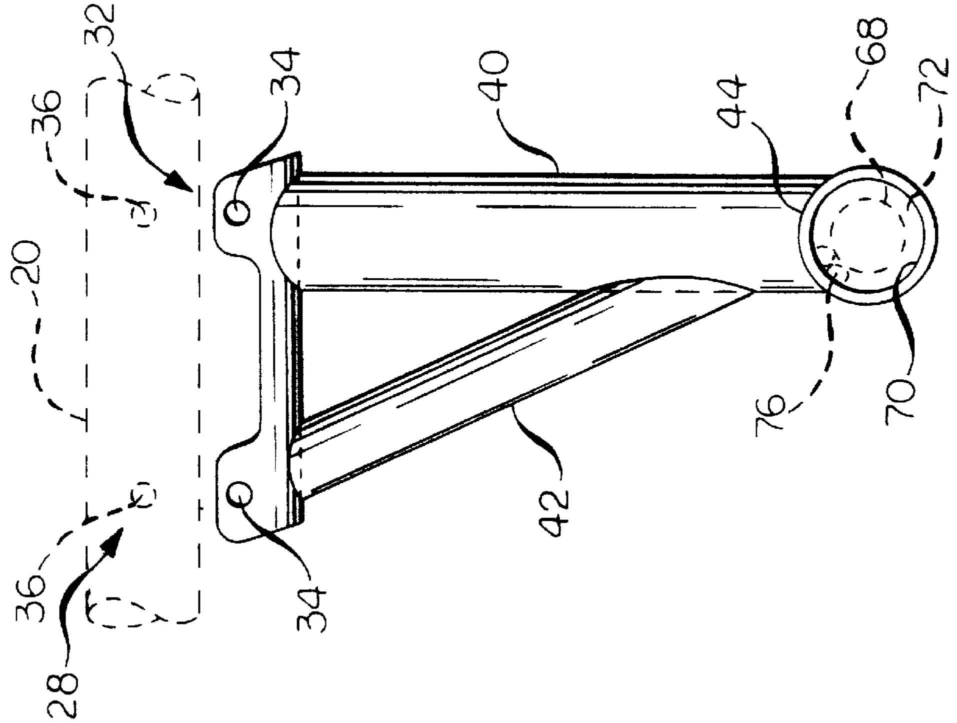
FIG. 4 is an elevational view of a mounting bracket for mounting the chassis.

Continuing with reference to FIGS. 4 and 5, each mounting bracket 28 is triangular in construction. The triangular shape is defined by a substantially vertically extending tubular member 40 and a forwardly projecting, angularly disposed tubular member 42. The cup-shaped members 32 are integrally attached to the upper ends of the tubular members 40 and 42 so as to be substantially disposed at a right angle relative to the vertically extending tubular member 40 and at an acute angle relative to the angularly disposed tubular member 42. A lower end of the angularly disposed tubular member 42 is integrally attached to a lower, forward surface of the vertically extending tubular member 40 substantially at an acute angle. The lower end of the vertically extending tubular member 40, below the angularly disposed tubular member 42, is a laterally extending sleeve 44. The sleeve 44 is dimensioned and configured to receive the rear wheel assembly 30, as is shown in FIG. 1. Each rear wheel assembly 30 preferably includes a conventional camber tube 46 (shown in FIG. 5). The camber tube 46 is engageable with the laterally extending sleeve 44. The camber tube 46 supports the rear wheel 48 (shown in FIG. 1) of the wheelchair 10 in a manner such that the rear wheel 48 is cambered. Alternatively, an axle (not shown) may be engageable with the laterally extending sleeve 44 and the axle may support the rear wheel 48. It should be understood that rear wheel 48 may be rotatable coupled to the lower end of the vertically extending tubular member 40 in any suitable manner. Moreover, it should be understood that the mounting bracket 28 may be in any suitable shape or configuration as long as it rotatably supports the rear wheel 48.

As shown in FIG. 1, each mounting bracket 28 is mounted to the rear end of a respective upper frame member 20 at a first mounting position. In this position, the mounting bracket 28 rigidly supports the rear wheel 48, providing a fixed chassis system. That is to say, each mounting bracket 28 maintains the hub of a rear wheel 48 in a fixed position relative to a respective upper frame member 20. No suspension system is provided.

Figure 2:
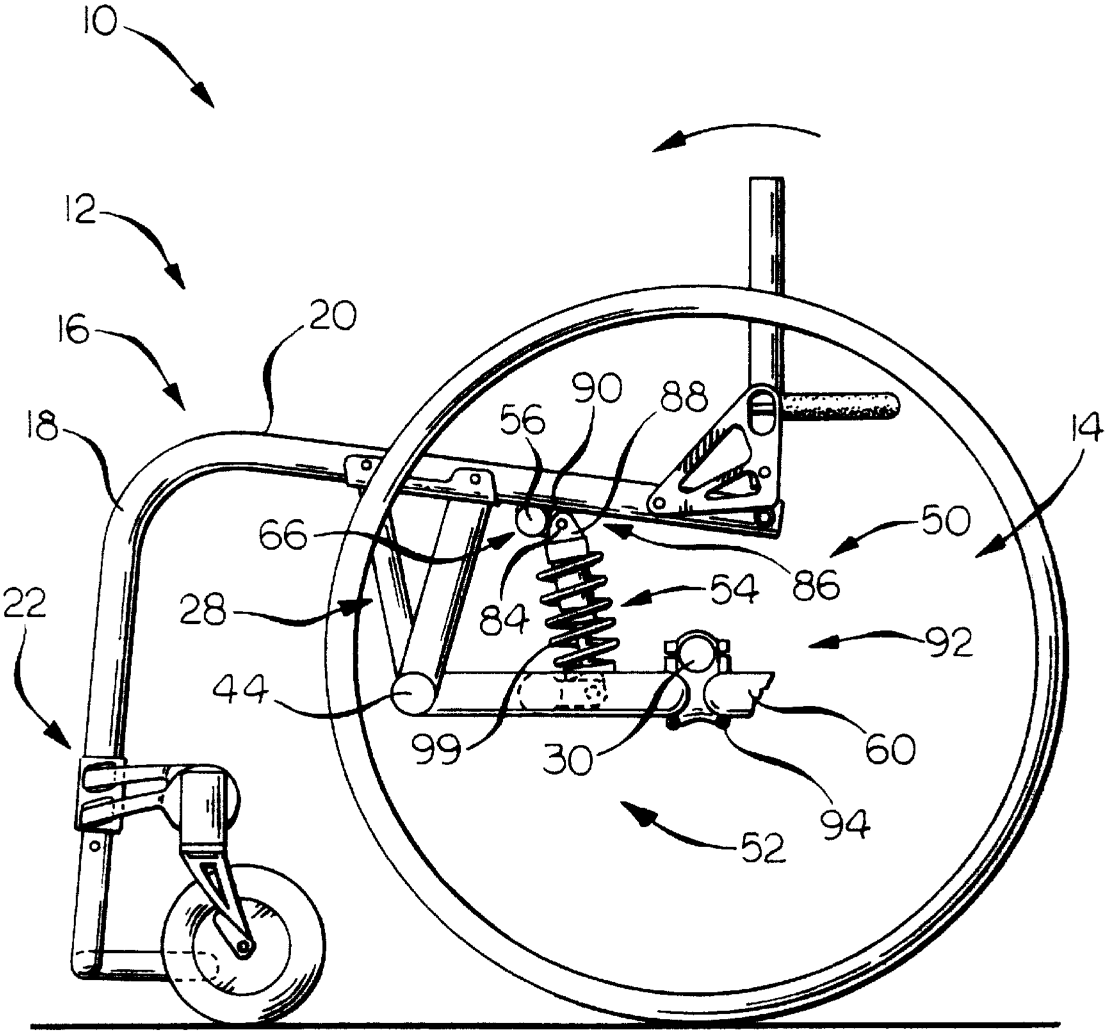
FIG. 2 is an elevational view of the wheelchair shown in FIG. 1 wherein the chassis is converted to a suspension chassis.
Figure 3:
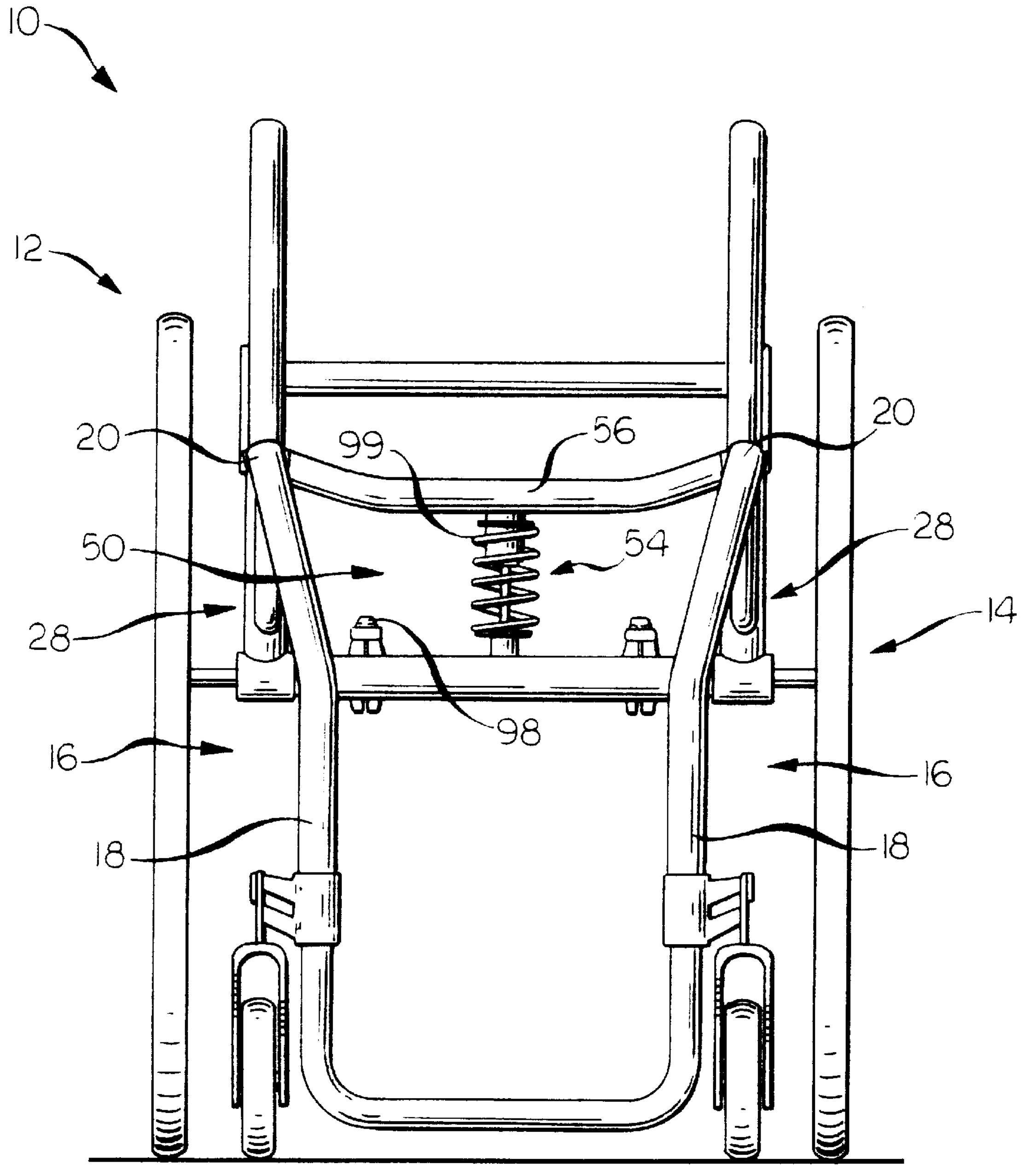
FIG. 3 is a front view of the wheelchair shown in FIG. 2.

Now with reference to FIGS. 2 and 3, each mounting bracket 28 is attached to a respective upper frame member 20 at a second mounting position. In this position, the mounting bracket 28 supports a suspension system 50 that suspends the hub of a rear wheel 48 relative to the upper frame members 20. The suspension system 50 shown includes a swing-arm assembly 52 pivotally supported by the sleeves 44. A suspension member, such as the mono-shock absorber 54 shown, extends from the swing-arm assembly 52 to a cross-member 56 extending laterally between the upper frame members 20. The suspension member 54 limits travel of the swing-arm assembly 52 and absorbs impact sustained by the wheelchair 10 during its operation.

Figure 7:
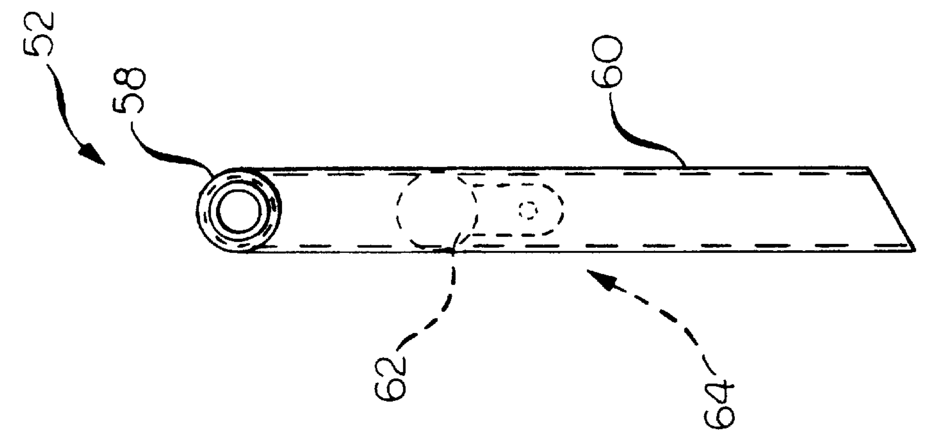
FIG. 7 is an elevation view of the swing arm shown in FIG. 6.
Figure 6:
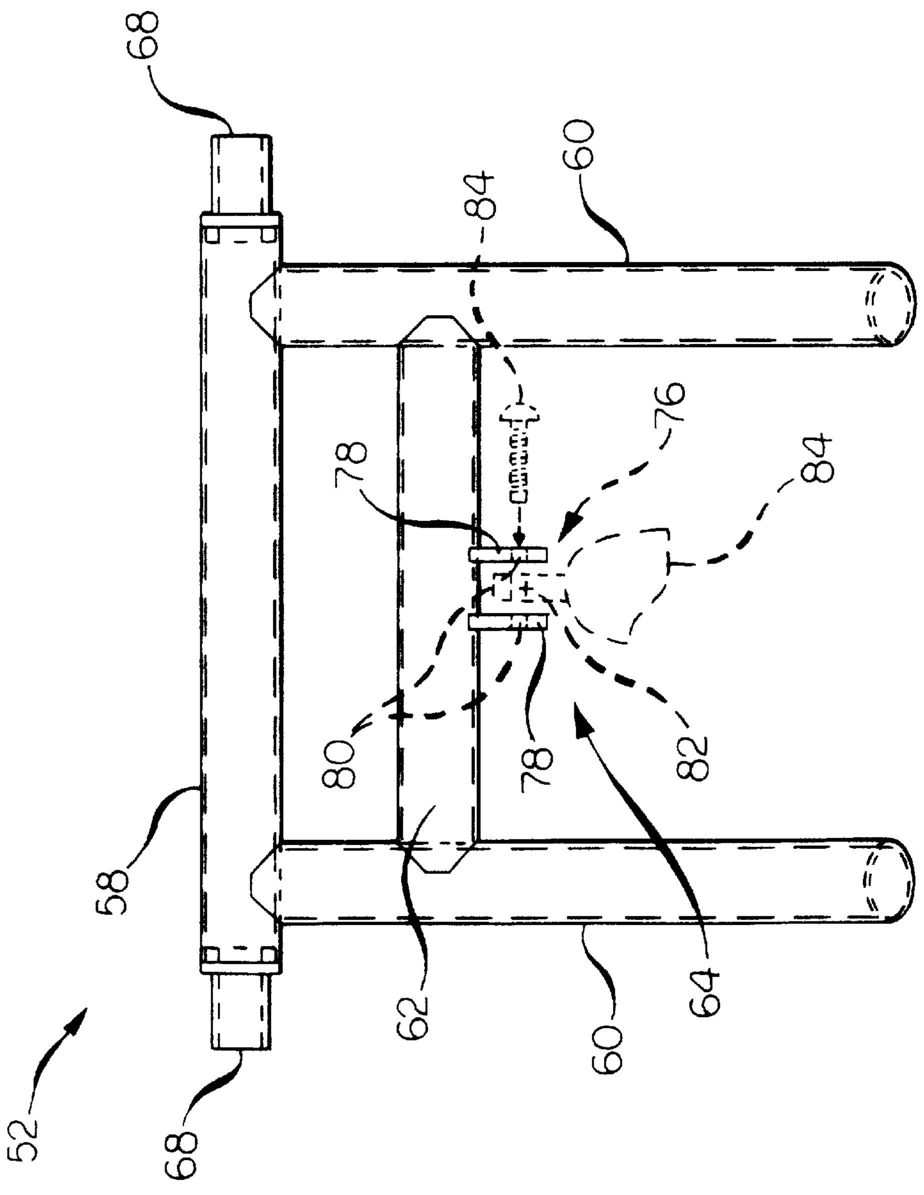
FIG. 6 is a plan view of a swing arm for the suspension chassis shown in FIGS. 2 and 3.

Although the swing-arm assembly 52 may be of any suitable structure and configuration, an example of a swing-arm assembly 52 is shown in FIGS. 6 and 7. This swing-arm assembly 52 is a substantially C-shaped configuration including a first laterally extending, tubular cross-member 58 and two spaced-apart tubular swing-arms 60 extending rearwardly from the first cross-member 58. A second cross-member 62 is disposed rearwardly of the first cross-member 58 and is parallel to the first cross-member 58. The second cross-member 62 extends laterally between the swing-arms 60. A lower link mounting point, generally indicated at 64, for the suspension member 54 extends rearwardly from the second cross-member 62. An upper link mounting point for the suspension member 54, generally indicated as 66 (shown in FIG. 2), extends rearwardly from the cross-member 56 (shown in FIG. 3) extending between the upper frame members 20.

The first cross-member 58 has a pivot lug 68 at each of its opposing ends, as shown in FIG. 4. Each pivot lug 68 is pivotally engageable with a respective sleeve 44. The inner surface of the sleeve 44 defines a bearing surface 70. An annular space 72 is defined between the bearing surface 70 and the pivot lug 68 for receiving a bearing 74. The pivot lugs 68 rotate within the sleeve 44 to permit the swing-arms 60 to swing. The bearings 74 reduce friction between the sleeves 44 and the pivot lugs 68 to enable the swing-arms 60 to swing smoothly. However, as set forth above, the suspension member 54 limits travel of the swing-arm assembly 52.

The suspension member 54 has a lower link 76 pivotally mounted to the swing-arm assembly 52 at lower link mounting point 64. Although this may be accomplished in any suitable manner, an example of a lower link 76 and lower link mounting point 64 are shown in FIGS. 6 and 7, which can be best understood with reference to the following description. The lower link mounting point 64 shown includes two laterally spaced-apart and parallel disposed tabs 78 extending rearwardly from the second cross-member 62. The tabs 78 are provided with co-aligning apertures 80. A lower link 76 of the suspension member 54 is received between the two tabs 78. An aperture 82 passing through the lower link 76 co-aligns with the co-aligning apertures 80 in the spaced-apart tabs 78. A pin or fastener 84 is engageable with the co-aligning apertures 80 and 82 to pivotally couple the lower link 76 of the suspension member 54 to the swing-arm assembly 52.

A similar arrangement may be provided for linking the upper link mounting point 66 (shown in FIG. 2) to an upper link 86 of the suspension member 54. For example, the upper link 86 shown includes two laterally spaced-apart tabs 88 (only one of which is shown) that extend upwardly from an upper end of the suspension member 54. The tabs 88 may be provided with co-aligning apertures (not shown). A single tab 90 extending rearwardly from the cross-member 56 extending between the upper frame members 20 is received between the two tabs 88 extending upwardly from the upper end of the suspension member 54. Apertures passing through all three tabs 88 and 90 co-align to receive pin or fastener 84 to pivotally couple the upper link 86 of the suspension member 54 to the cross-member 56.

The placement of the suspension member 54 between the upper cross-member 56 and the lower cross-member 62 permits limited travel of the swing-arms 60 in both upward and downward directions. Although movement is limited, a certain degree of movement is permitted due to the resilient character of the suspension member 54. The least amount of movement is experienced closest to the suspension member 54 while the greatest amount of movement is experienced furthest away from the suspension member 54. This varying degree of movement is taken advantage of by mounting rear wheel assemblies 30 to the swing-arms 60 with sliding clamps. The clamps clamp to the swing-arms 60 at various points along the swing-arms 60. By clamping the wheel assemblies 30 to the suspension member 54, the frame 12 is afforded little movement relative to the rear wheels 48. By clamping the clamps further away from the suspension member 54, the frame 12 is afforded the greatest amount of movement relative to rear wheels 48.

Although other clamps may be employed, an example of a suitable clamp 92 is shown in FIGS. 2 and 3. The clamp 92 shown includes a lower portion that is at least partially bifurcated into two halves along a longitudinal axis. The two halves may be sufficiently separated by loosening threaded fasteners 94 to permit the lower portion of the clamps 92 to slide along the swing-arms 60. Once the clamps 92 are in a desired location, the lower portion of the clamps 92 may be tightened about the swing-arms 60 by tightening the threaded fasteners 94. An upper portion of each clamp 96 is similarly bifurcated. The upper portion of the clamps 96 may be sufficiently separated to receive a wheel assembly 30 by loosening threaded fasteners 98 to permit the wheel assemblies 30 to engage the upper portion of the clamps 92. Once the wheel assemblies are in place, the upper portion of each clamp 92 may be tightened about the wheel assemblies by tightening the threaded fasteners 98.

Placing the wheel assemblies 30 too close to the suspension member 50 may result in an insufficient amount of movement of the wheel assemblies 30 which, in turn, may result in a substantially rigid suspension. But placing the wheel assemblies 30 too remote from the suspension member 54 may affect the performance of the suspension member 54. The performance of a suspension member, such as the mono-shock absorber shown, may be improved with a supplemental element 99, such as the integral spring wrap concentrically about the suspension member 54. It should be noted, however, that too much resistance may likewise result in a substantially rigid suspension. The suspension chassis should operate to deliver a balance between movement and resistance to movement.

Figure 8:
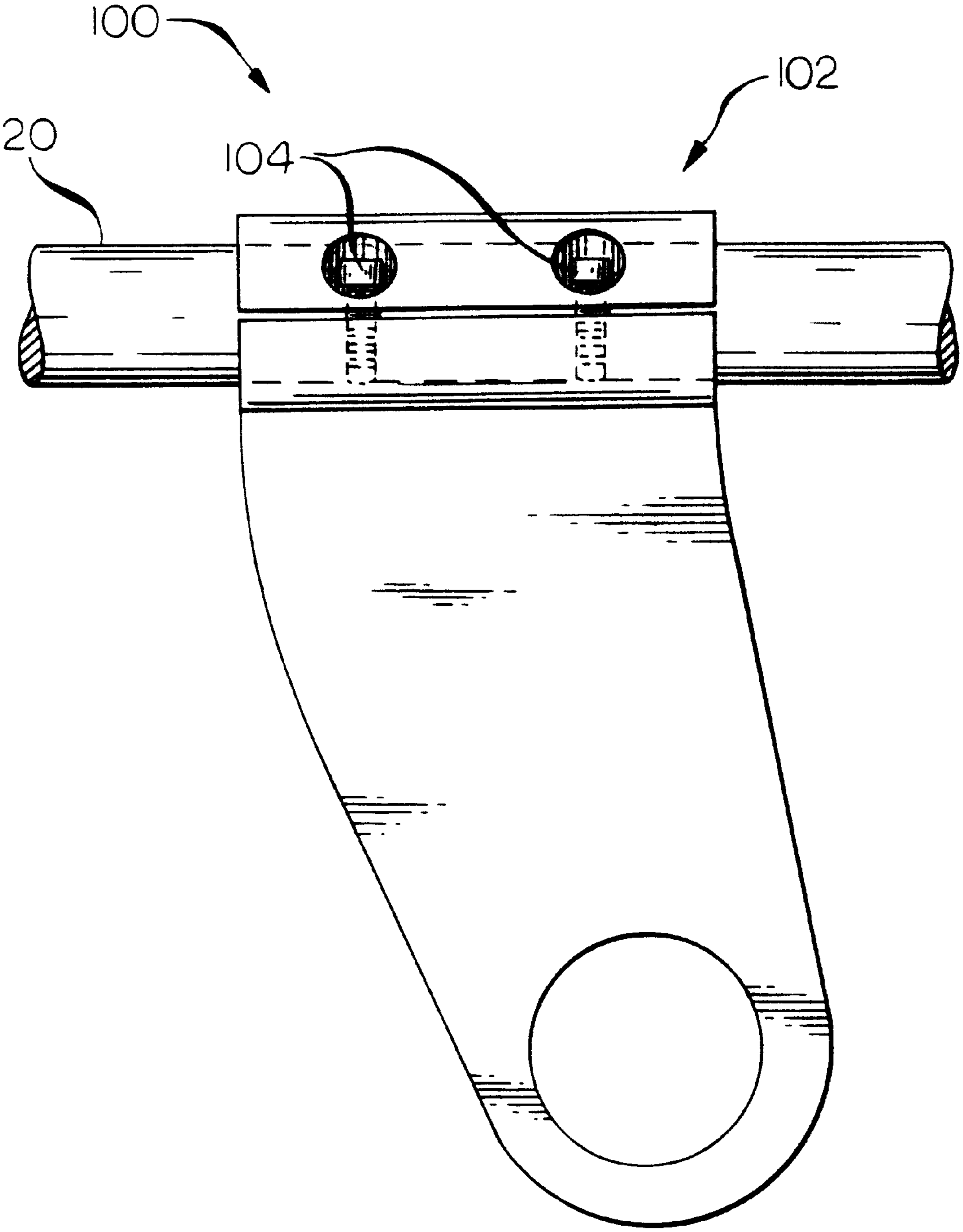
FIG. 8 is an elevation view of an alternative mounting bracket.

Several points should be noted for consideration. Although the same mounting brackets 28 are used to construct the fixed chassis system shown in FIG. 1 and the suspension chassis system shown in FIGS. 2 and 3, a different mounting bracket can be use to construct each chassis system. Moreover, alternative mounting brackets can be used such as the mounting bracket 100 shown in FIG. 8. This mounting bracket 100 has a clamp 102 at its upper end. Each clamp 102 is separable into two parts by removing or loosening threaded fasteners 104 to open and receive a respective upper frame member 20. Subsequently, the clamp 102 may be closed and the threaded fasteners 104 tightened to tighten the clamp 102 tightly against the upper frame members 20.

Additional frame members, such as cross-members (not shown) extending laterally between the two side frame members 16, may be added to improve the structural integrity of the frame 12. Perhaps additional chassis components, such a cross-member (not shown) extending laterally between the two mounting brackets 28, may be added to improve the structural integrity of the chassis. A camber tube (not shown) that extends laterally between the two mounting brackets 28 may function as a chassis cross member to increase the structural integrity of either chassis.

It should be noted that the center of gravity of the user relative to the rear wheels 48 may be varied by varying the position of the mounting brackets 28 relative to upper frame members 20. It should also be noted that the height of the seat 34 may be varied by varying length of the mounting brackets 28.

Although the swing-arm assembly 54 shown is comprised of four tubular members 58, 60, and 62, as is clearly shown in FIG. 6, it should be understood that fewer or more structural components may be sufficient for carrying out the instant invention.

Figure 9:
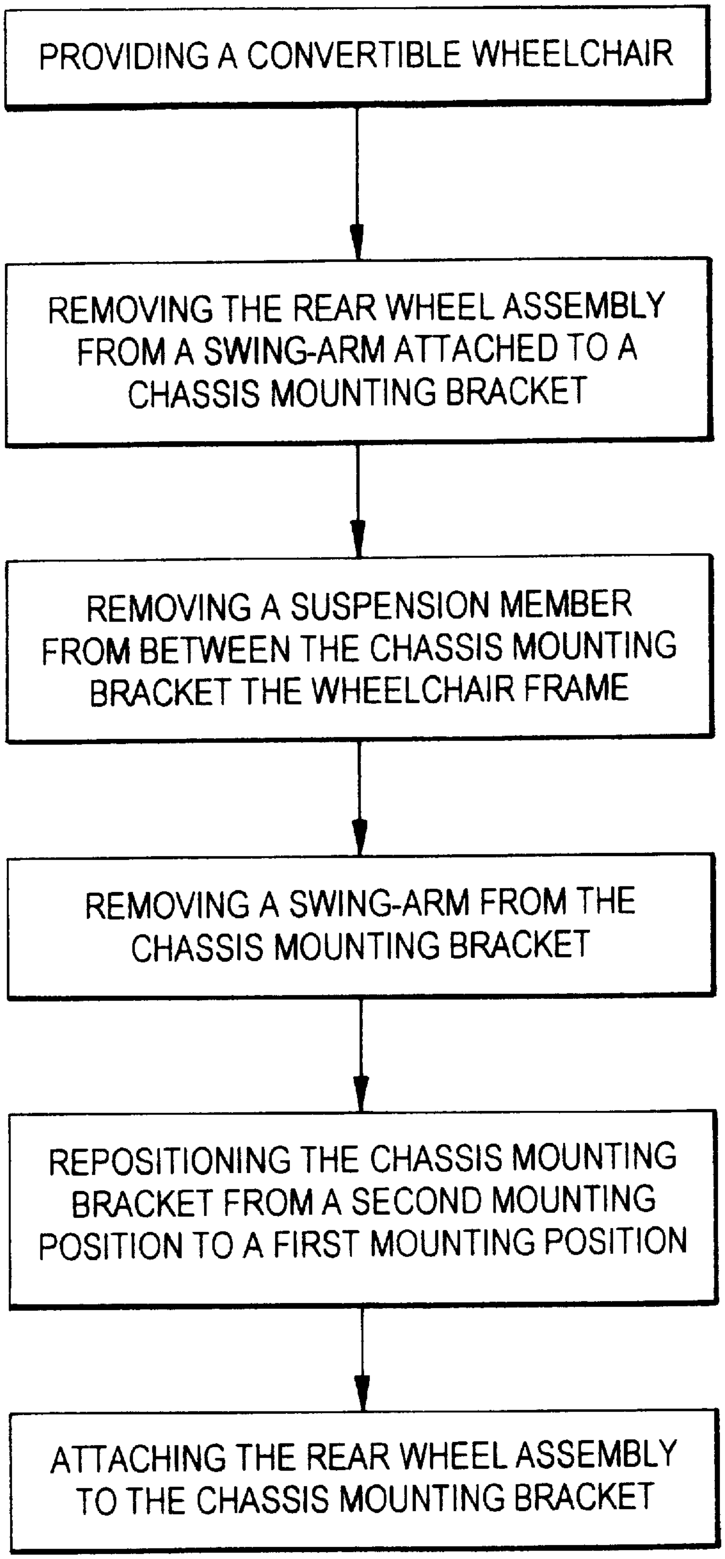
FIG. 9 is a flow chart representing a method for converting a fixed chassis to a suspension chassis.
Figure 10:
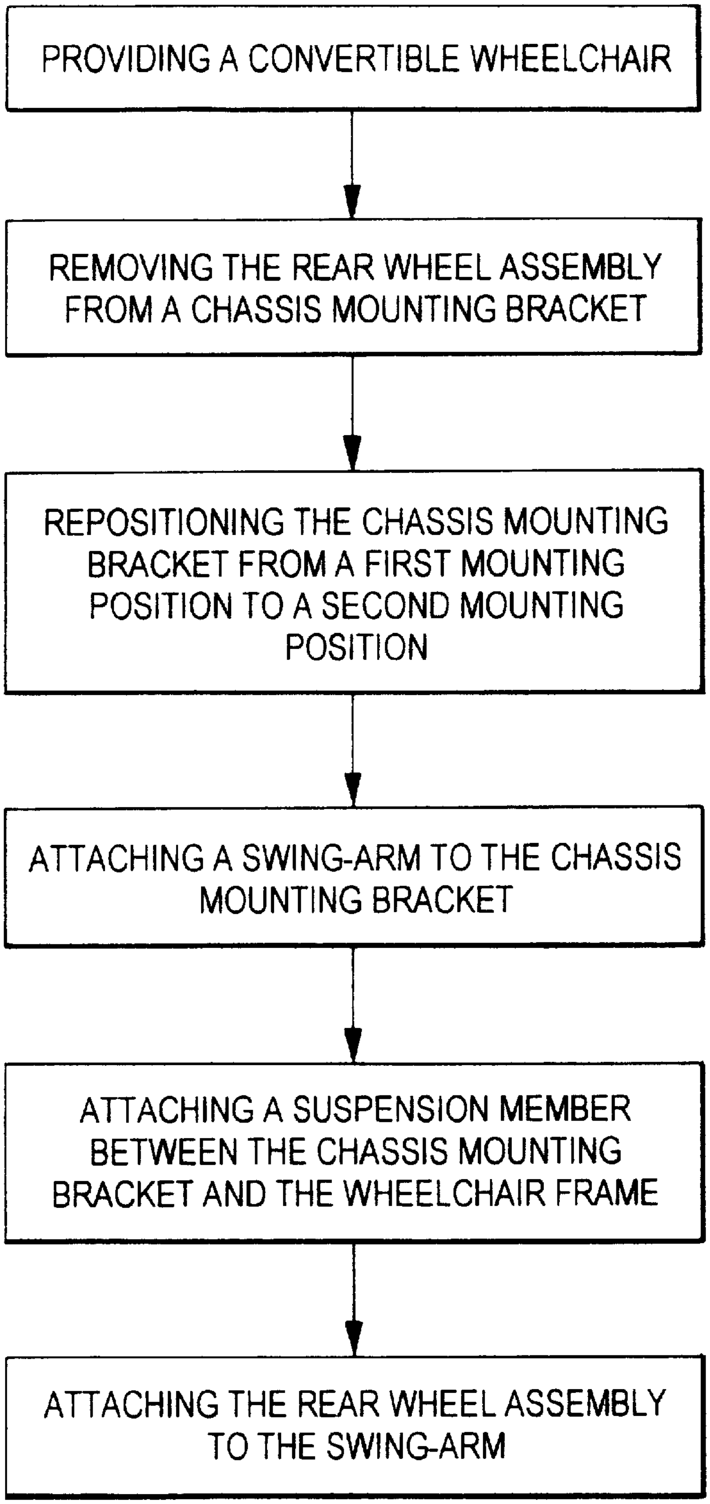
FIG. 10 is a flow chart representing a method for converting a suspension chassis to a fixed chassis.

It should be clearly understood that the chassis of the wheelchair 10 may be convertible from a fixed chassis to a suspension chassis and vice versa. For example, the fixed chassis can be converted to the suspension chassis simply by repositioning the mounting brackets 28, attaching the swing-arm assembly 52 to the mounting bracket 28, and attaching the suspension member 54 between the swing arm assembly 52 and the cross member 56 extending laterally between the upper frame member 20. A method for converting a fixed chassis to a suspension chassis is illustrated in FIG. 9. Similarly, the suspension chassis can be converted to the fixed chassis by the suspension member 54, removing the swing-arm assembly 52, and repositioning the mounting bracket 28 to rigidly support the rear wheel assembly 30. The suspension chassis may be preferred if the wheelchair is used on uneven terrain or around obstacles to reduce fatigue and minimize impact from the terrain or obstacles. The fixed chassis may be preferred in more stable environments or otherwise when rigid support is desired. The frame 12 and chassis 14 construction allows a user to choose an optimum chassis configuration to meet his or her needs and allows the user to change from one wheelchair configuration to another in accordance with those needs.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:

a frame having two side frame members, each one of said side frame members comprising an upper frame member, each one of said upper frame members comprising at least a first mounting position and a second mounting position;

a chassis comprising two mounting brackets, each one of said mounting brackets being attachable to a respective one of said upper frame members, said mounting brackets being selectively attachable at said first mounting position and said second mounting position, each one of said mounting brackets comprising a lower end, said lower ends being structured and configured to directly support a rear wheel assembly when said mounting brackets are attached at said first mounting position and pivotally support a swing-arm assembly and suspension member when said mounting brackets are attached at said second mounting position, said swing-arm assembly being structured and configured to support said rear wheel assemblies.

2. A wheelchair according to claim 1, wherein each one of said side frame members is L-shaped in construction.

3. A wheelchair according to claim 1, wherein said swing-arm assembly includes a two laterally spaced-apart swing-arms and two slidable clamps, each one of said slidable clamps being slidably engageable with a respective one of said swing-arms, said slidable clamps being structured and configured to support said rear wheel assemblies.

4. A wheelchair according to claim 3, wherein each one of said rear wheel assemblies includes a camber tube, each one of said camber tubes being supported by a respective one of said lower ends of said mounting brackets when said mounting brackets are attached at said first mounting position and being supported by said slidable clamps when said mounting brackets are attached at said second mounting position.

5. A wheelchair according to claim 1, wherein each one of said rear wheel assemblies includes a camber tube, each one of said camber tubes supported by a respective one of said lower ends of said mounting brackets when said mounting brackets are attached at said first mounting position and supported by said swing-arm assembly when said mounting brackets are attached at said second mounting position.

6. A wheelchair according to claim 1, further including:

a plurality fasteners, each one of said mounting brackets including an upper cup-shaped member, each one of said cup-shaped members being engageable with a respective one of said upper frame members, each one of said cup-shaped members having a plurality of holes, said holes in said cup-shaped members being arranged to co-align with a plurality of holes in said upper frame members at said first mounting position and said second mounting position, said fasteners being engageable with said co-aligning holes at said first mounting position to affix said cup-shaped member to said upper frame member at said first mounting position, said fasteners being engageable with said co-aligning holes at said second mounting position to affix said cup-shaped member to said upper frame member at said second mounting position.

7. A wheelchair according to claim 1, wherein each one of said mounting brackets includes an upper clamp, each one of said clamps being engageable with said upper frame members, each one of said clamps being at least partially separable to receive a respective one of said upper frame members, said clamps being configured to close tightly against said upper frame members.

8. A wheelchair according to claim 1, wherein each one of said mounting brackets includes a lower sleeve, and said swing-arm includes a laterally extending, cross-member having opposing pivot lugs, each one of said pivot lugs being pivotally engageable with a respective one of said sleeves.

9. A wheelchair according to claim 8, further including:

an annular space defined between said pivot lugs and said sleeves, and a bearing disposed in each one of said annular spaces.

10. A wheelchair according to claim 1, wherein said suspension member is a mono-shock absorber.

11. A wheelchair according to claim 10, wherein said suspension member includes a spring integral with said shock absorber and arranged concentrically about said shock absorber.

12. A wheelchair comprising:

a frame having two side frame members, each one of said side frame members comprising an upper frame member, each one of said upper frame members comprising at least a first mounting position and a second mounting position;

a chassis comprising a first set of mounting brackets including two mounting brackets each being removably attachable to a respective one of said upper frame members at said first mounting position, said chassis further comprising a second set of mounting brackets including two mounting brackets each being removably attachable to a respective one of said upper frame members at said second mounting position, said two mounting brackets of said first set of mounting brackets each including lower ends structured and configured to directly support a rear wheel assembly when said first set of mounting brackets are attached to said upper frame members at said first mounting position, said two mounting brackets of said second set of mounting brackets each including lower ends structured and configured to pivotally support a swing-arm assembly and a suspension member when said mounting brackets of said second set of mounting brackets are attached to said upper frame members at said second mounting position, said swing-arm assembly being configured to support said rear wheel assemblies.

13. A wheelchair according to claim 12, wherein each one of said side frame members is L-shaped in construction.

14. A wheelchair according to claim 12, wherein said swing-arm assembly includes a two laterally spaced-apart swing-arms and two slidable clamps, each one of said slidable clamps being slidably engageable with a respective one of said swing-arms, said slidable clamps being structured and configured to support said rear wheel assemblies.

15. A wheelchair according to claim 14, wherein each one of said rear wheel assemblies includes a camber tube, each one of said camber tubes being supported by a respective one of said lower ends of said mounting brackets of said first set of mounting brackets when first set of said mounting brackets are attached at said first mounting position and being supported by said slidable clamps when said second set of mounting brackets are attached at said second mounting position.

16. A wheelchair according to claim 12, wherein each one of said rear wheel assemblies includes a camber tube, each one of said camber tubes supported by a respective one of said lower ends of said mounting brackets of said first set of mounting brackets when said first set of said mounting brackets is attached at said first mounting position and supported by said slidable clamps when said second set of mounting brackets is attached at said second mounting position.

17. A wheelchair according to claim 12, further including:

a plurality fasteners, each one of said mounting brackets including an upper cup-shaped member, each one of said cup-shaped members being engageable with a respective one of said upper frame members, each one of said cup-shaped members having a plurality of holes, said holes in said cup-shaped members in said first set of mounting brackets being arranged to co-align with a plurality of holes in said upper frame members at said first mounting position, said holes in said cup-shaped members in said second set of mounting brackets being arranged to co-align with a plurality of holes in said upper frame members at said second mounting position, said fasteners being engageable with said co-aligning holes at said first mounting position to affix said cup-shaped member of said first set of mounting brackets to said upper frame member at said first mounting position, said fasteners being engageable with said co-aligning holes at said second mounting position to affix said cup-shaped member of said second set of mounting brackets to said upper frame member at said second mounting position.

18. A wheelchair according to claim 12, wherein each one of said mounting brackets includes an upper clamp, each one of said clamps being engageable with said upper frame members, each one of said clamps being at least partially separable to receive a respective one of said upper frame members, said clamps being configured to close tightly against said upper frame members.

19. A wheelchair according to claim 12, wherein each one of said mounting brackets of said second set of mounting brackets includes a lower sleeve, and said swing-arm includes a laterally extending, cross-member having opposing pivot lugs, each one of said pivot lugs being pivotally engageable with a respective one of said sleeves.

20. A wheelchair according to claim 19, further including:

an annular space defined between said pivot lugs and said sleeves, and a bearing disposed in each one of said annular spaces.

21. A wheelchair according to claim 12, wherein said suspension member is a mono-shock absorber.

22. A wheelchair according to claim 21, wherein said suspension member includes a spring integral with said shock absorber and arranged concentrically about said shock absorber.

* * * * *